(12) United States Patent
Chiba et al.

(10) Patent No.: US 12,252,211 B2
(45) Date of Patent: Mar. 18, 2025

(54) HYDRAULIC PRESSURE CONTROL UNIT, BRAKE SYSTEM, AND STRADDLE-TYPE VEHICLE

(71) Applicant: Robert Bosch GmbH, Stuttgart (DE)

(72) Inventors: Kazuki Chiba, Kanagawa (JP); Hiroaki Atsushi, Kanagawa (JP); Shigeki Ikeda, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 575 days.

(21) Appl. No.: 17/638,487

(22) PCT Filed: Aug. 17, 2020

(86) PCT No.: PCT/IB2020/057722
§ 371 (c)(1),
(2) Date: Feb. 25, 2022

(87) PCT Pub. No.: WO2021/038365
PCT Pub. Date: Mar. 4, 2021

(65) Prior Publication Data
US 2022/0411010 A1    Dec. 29, 2022

(30) Foreign Application Priority Data

Aug. 29, 2019   (JP) .................................. 2019-156224

(51) Int. Cl.
*B62L 3/02*    (2006.01)
*B60T 8/17*    (2006.01)
(Continued)

(52) U.S. Cl.
CPC ............ *B62L 3/023* (2013.01); *B60T 13/142* (2013.01); *B60T 13/686* (2013.01); *B60T 17/22* (2013.01);
(Continued)

(58) Field of Classification Search
CPC ...... B62L 3/023; B60T 13/142; B60T 13/686; B60T 17/22; B60T 8/176
(Continued)

(56) References Cited

U.S. PATENT DOCUMENTS 4,893,878 A * 1/1990 Cole ....................... B60T 8/265
60/591
5,018,796 A * 5/1991 Ishimaki ................... B60T 8/26
303/9.75

(Continued)

FOREIGN PATENT DOCUMENTS

DE      19508915 A1   9/1996
JP      H1134834 A    2/1999
(Continued)

OTHER PUBLICATIONS

International Search Report and Written Opinion for Application No. PCT/IB2020/057722 dated Nov. 9, 2020 (9 pages).

*Primary Examiner* — Jacob D Knutson
*Assistant Examiner* — Morgan Rappe
(74) *Attorney, Agent, or Firm* — Michael Best & Friedrich LLP

(57) ABSTRACT

A hydraulic pressure control unit capable of suppressing application of an external force thereto in comparison with the related art at the time when mounted to a straddle-type vehicle is obtained.

A hydraulic pressure control unit (1) includes a base body (10) that is formed with a master cylinder port (11), a wheel cylinder port (12), and an internal channel (13) communicating the master cylinder port (11) and the wheel cylinder port (12) with each other. The master cylinder port (11) is formed in an upper surface (25) of the base body (10), and the wheel cylinder port (12) is formed in a lower surface (26) of the base body (10), the lower surface (26) opposing the upper surface (25). The internal channel (13) is configured
(Continued)

not to be able to return a brake fluid in an accumulator (33) to the master cylinder port (11) without interposing an outlet valve (32). An inlet valve recess (18) and an outlet valve recess (19) are aligned in a direction in which the upper surface (25) and the lower surface (26) are aligned.

20 Claims, 7 Drawing Sheets

(51) Int. Cl.
    *B60T 8/176*     (2006.01)
    *B60T 13/14*     (2006.01)
    *B60T 13/68*     (2006.01)
    *B60T 17/22*     (2006.01)
    *B62K 21/02*     (2006.01)

(52) U.S. Cl.
    CPC ............. *B60T 8/1706* (2013.01); *B60T 8/176* (2013.01); *B60T 2270/10* (2013.01); *B60T 2270/88* (2013.01); *B62K 21/02* (2013.01)

(58) Field of Classification Search
    USPC ........................................................ 280/274
    See application file for complete search history.

(56) References Cited

U.S. PATENT DOCUMENTS

| | | | | |
|---|---|---|---|---|
| 8,746,810 | B2 * | 6/2014 | Atsushi | .................... B60T 8/368 |
| | | | | 303/DIG. 10 |
| 2014/0159473 | A1 * | 6/2014 | Kuhlman | ............... B60T 13/745 |
| | | | | 303/14 |
| 2015/0344009 | A1 * | 12/2015 | Hagspiel | ................. B62L 3/023 |
| | | | | 303/119.1 |
| 2017/0210364 | A1 * | 7/2017 | Sagayama | ............... B60T 8/363 |

FOREIGN PATENT DOCUMENTS

| | | | | |
|---|---|---|---|---|
| JP | 6118424 | B2 | 4/2017 | |
| WO | 2014108235 | A1 | 7/2014 | |
| WO | WO-2014108234 | A1 * | 7/2014 | ............ B60T 8/1706 |
| WO | 2019159046 | A1 | 8/2019 | |

* cited by examiner

[FIG. 1]
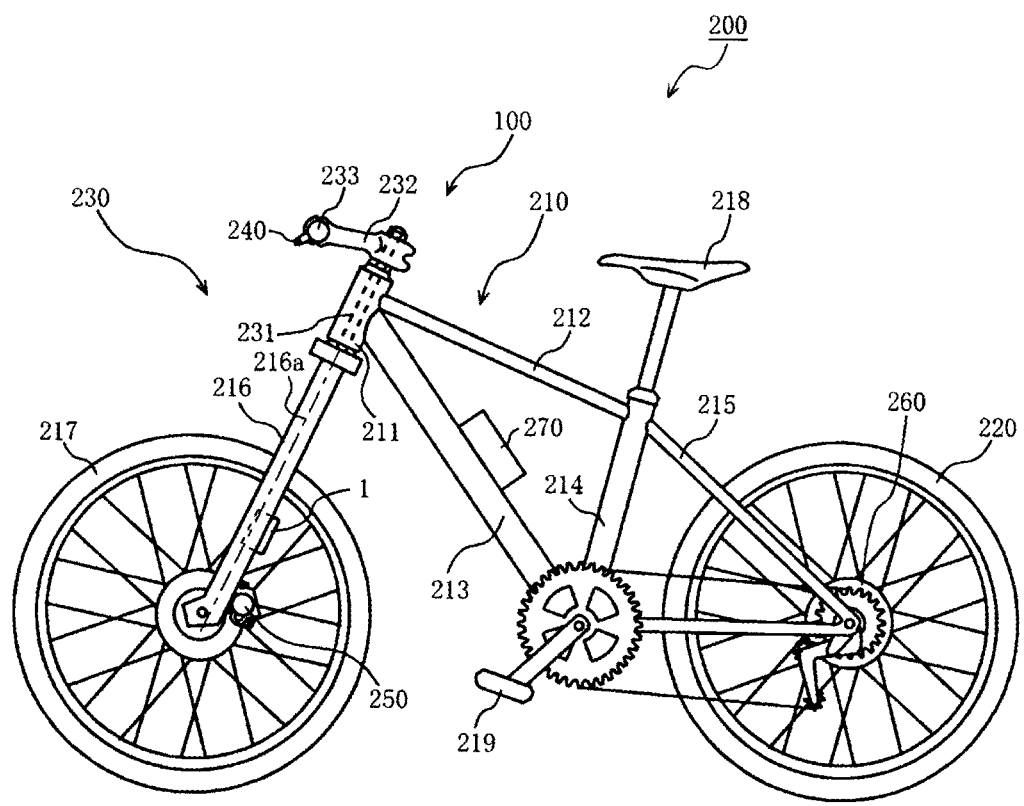

[FIG. 2]
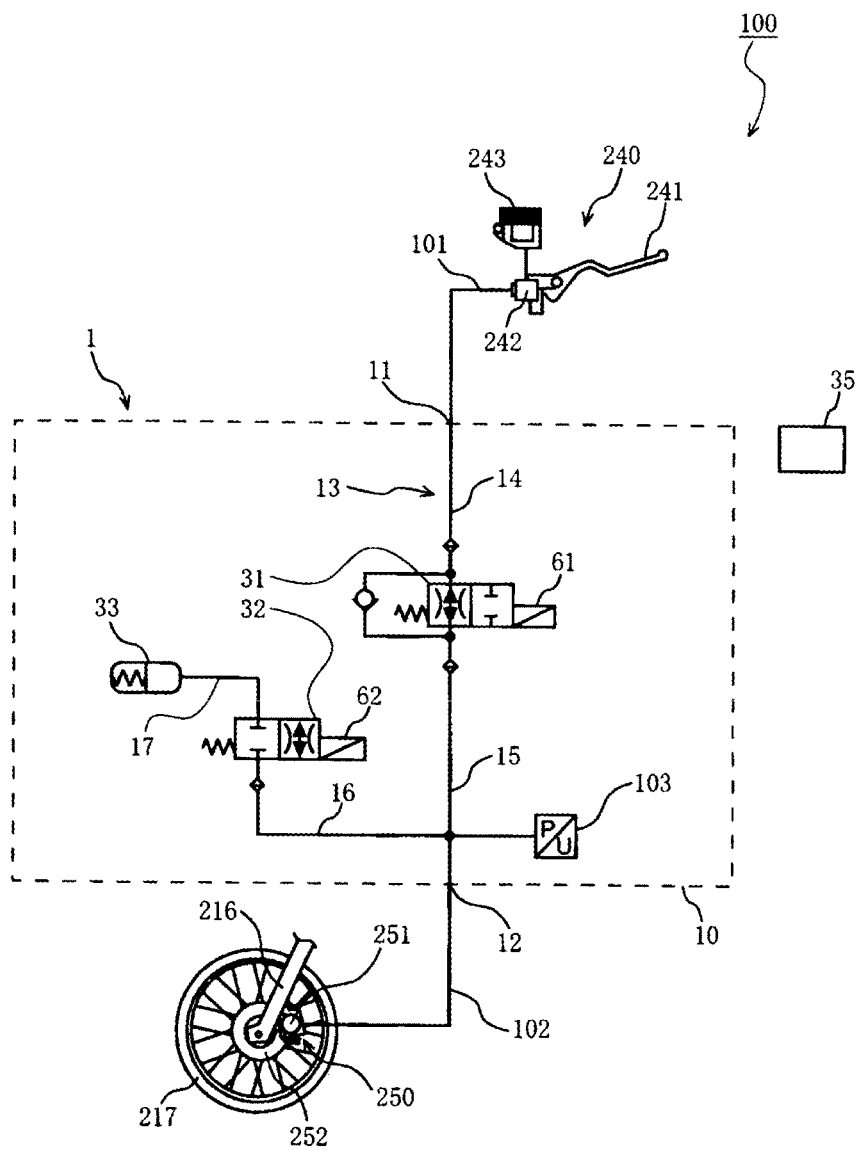

[FIG. 3]
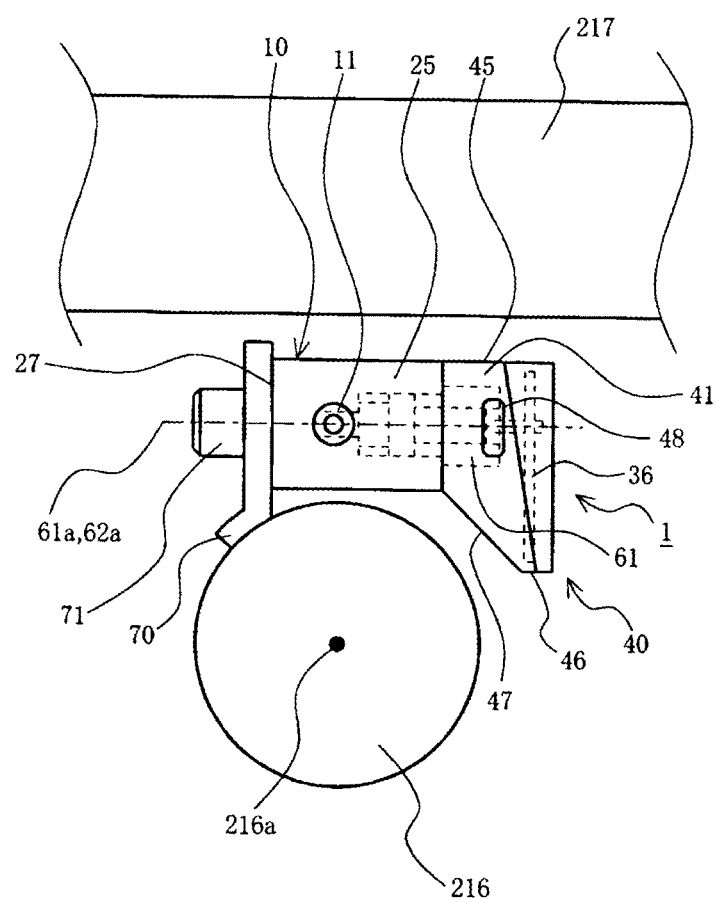

[FIG. 4]
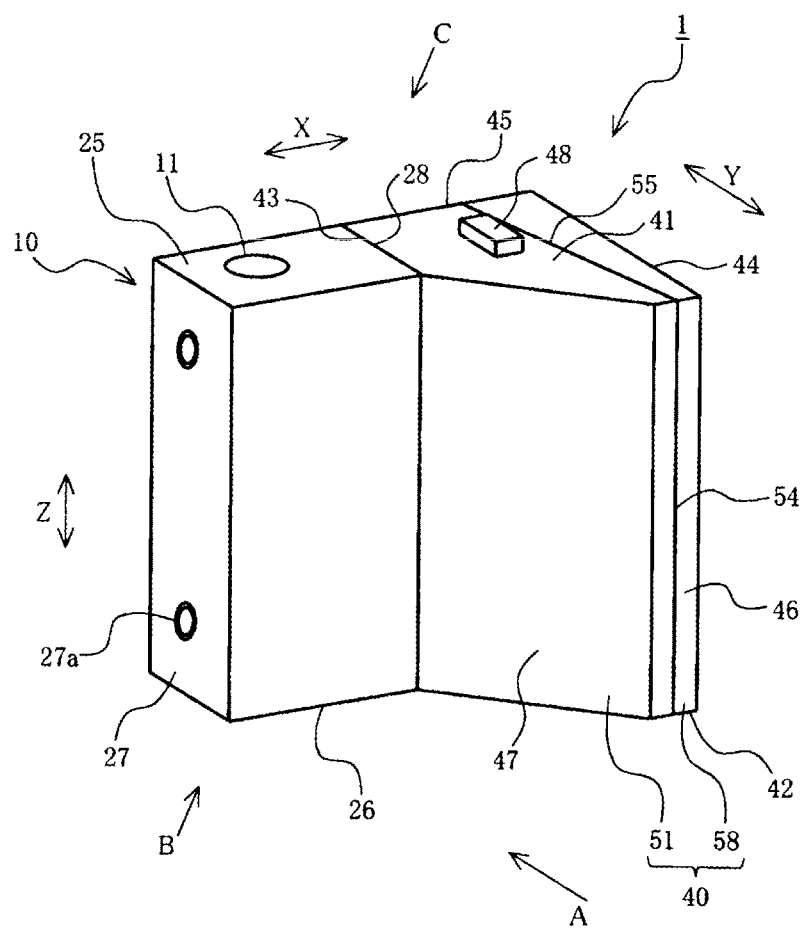

[FIG. 5]
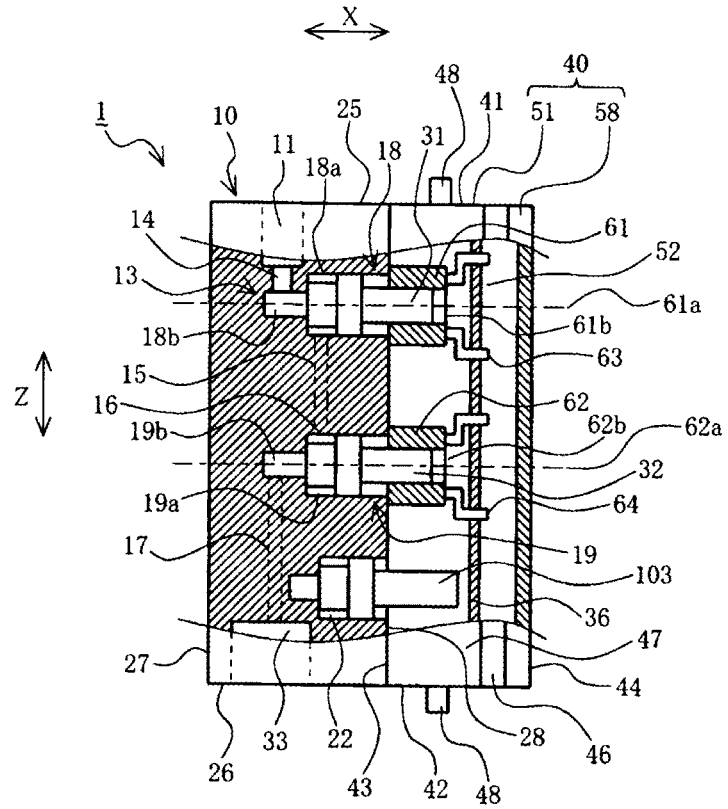
[FIG. 6]
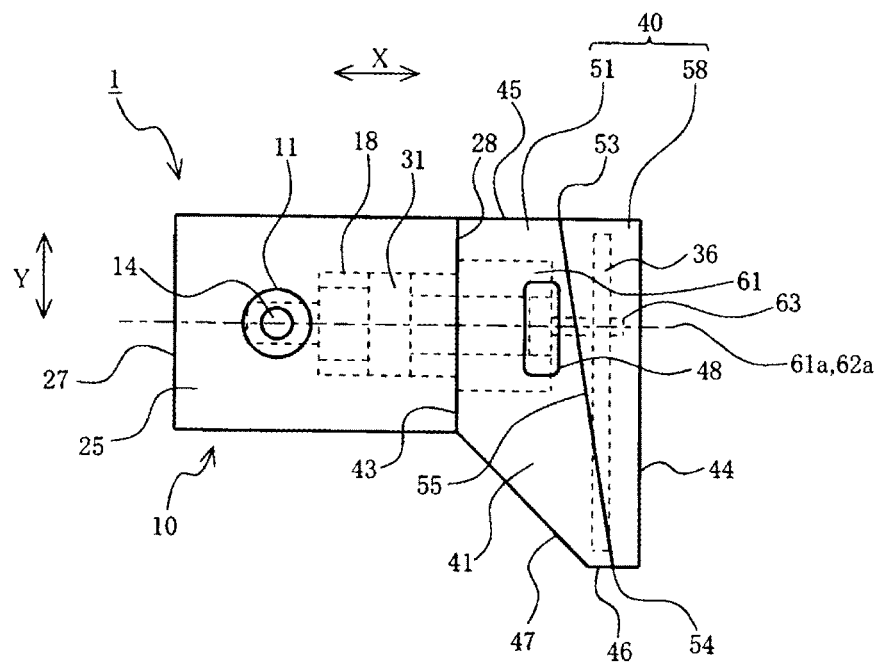

[FIG. 7]
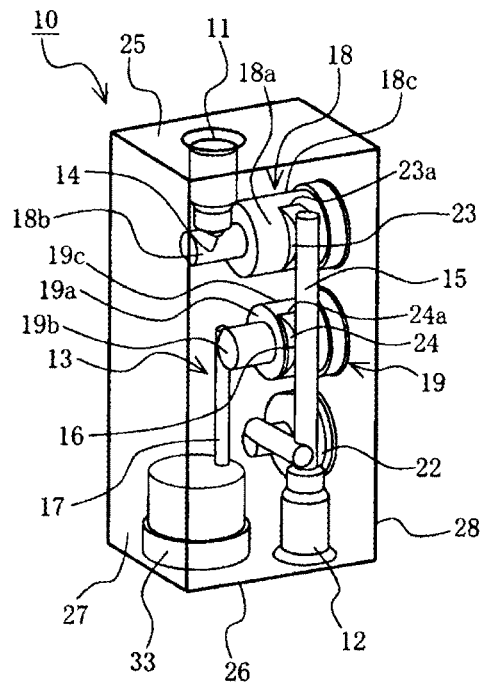
[FIG. 8]
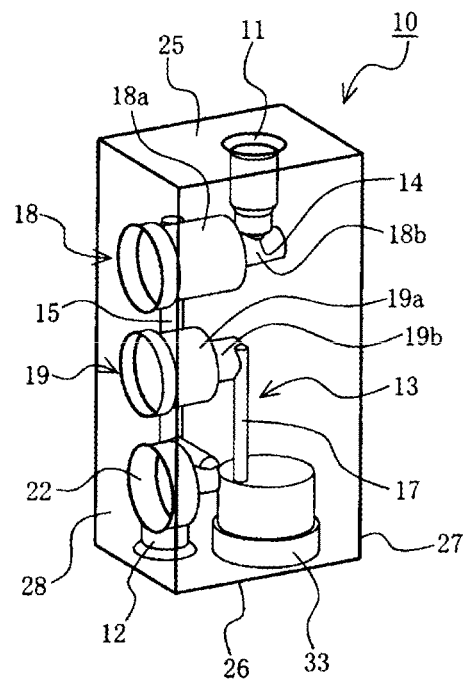

[FIG. 9]
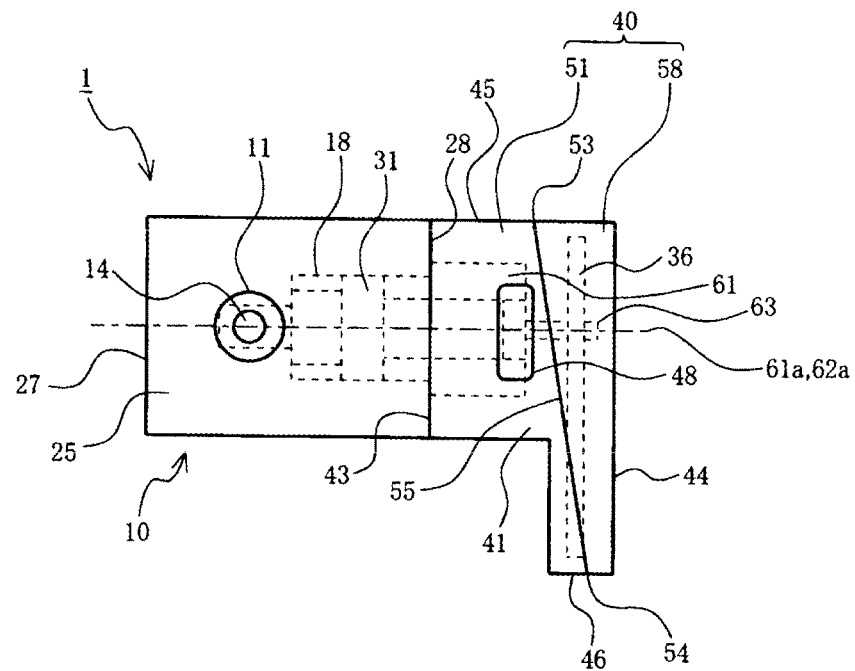
[FIG. 10]
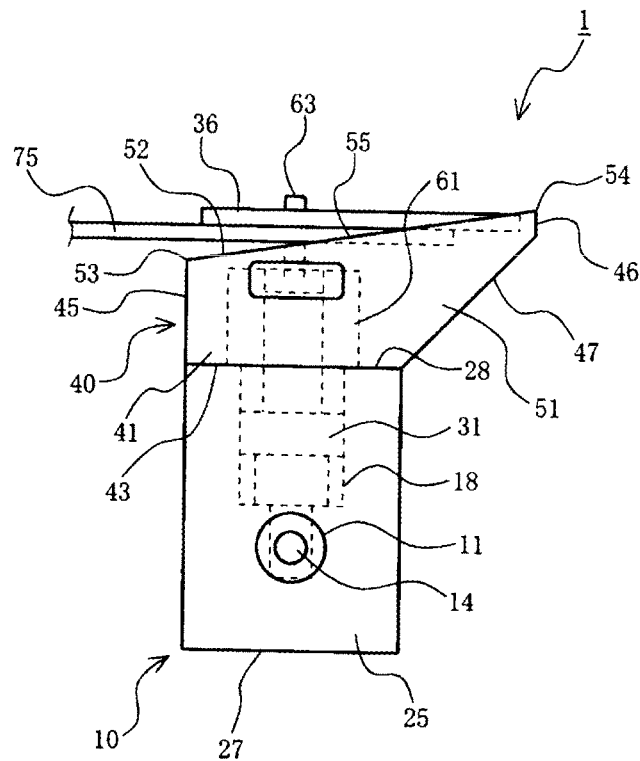

HYDRAULIC PRESSURE CONTROL UNIT, BRAKE SYSTEM, AND STRADDLE-TYPE VEHICLE

BACKGROUND OF THE DESCRIPTION

The present invention relates to a hydraulic pressure control unit for a brake system mounted to a straddle-type vehicle, a brake system including the hydraulic pressure control unit, and a straddle-type vehicle including the brake system.

A conventional straddle-type vehicle that includes a brake system capable of executing anti-lock brake control for controlling a braking force on a wheel by controlling a hydraulic pressure of a brake fluid has been available. Such a brake system includes a hydraulic pressure control unit. This hydraulic pressure control unit includes a base body formed with: a master cylinder port to which a fluid pipe communicating with a master cylinder is connected; a wheel cylinder port to which a fluid pipe communicating with a wheel cylinder is connected; and an internal channel that communicates the master cylinder port and the wheel cylinder port with each other. The hydraulic pressure control unit also includes: an inlet valve that is provided to an inlet valve recess formed in the base body and opens/closes the internal channel during the anti-lock brake control; and an outlet valve that is provided to an outlet valve recess formed in the base body and opens/closes the internal channel during the anti-lock brake control.

When mounted to the straddle-type vehicle, the hydraulic pressure control unit is held by a front fork of the straddle-type vehicle, for example (see Japanese Patent No. 6,118,424). At this time, when the straddle-type vehicle is seen in a front view, at least a part of the conventional hydraulic pressure control unit is arranged on an outer side of the front fork. In other words, when the straddle-type vehicle, to which the conventional hydraulic pressure control unit is mounted, is seen in the front view, at least the part of the conventional hydraulic pressure control unit is arranged in a region on an opposite side of a front wheel with the front fork that holds the hydraulic pressure control unit being a reference. PTL 1:

SUMMARY OF THE INVENTION

As described above, when the straddle-type vehicle is seen in the front view, at least the part of the conventional hydraulic pressure control unit is arranged on the outer side of the front fork. For this reason, the conventional hydraulic pressure control unit is likely to be applied with an external force, for example, when a flipped stone or the like hits the conventional hydraulic pressure control unit during travel of the straddle-type vehicle. The conventional hydraulic pressure control unit is also likely to be applied with the external force by hitting the ground or the like when the straddle-type vehicle falls. Just as described, there is a problem that the conventional hydraulic pressure control unit is in a state of being likely to be applied with the external force when mounted to the straddle-type vehicle.

The present invention has been made with the above-described problem as the background and therefore has a purpose of obtaining a hydraulic pressure control unit capable of suppressing application of an external force thereto in comparison with the related art when mounted to a straddle-type vehicle. The present invention also has a purpose of obtaining a brake system that includes such a hydraulic pressure control unit. The present invention further has a purpose of obtaining a straddle-type vehicle that includes such a brake system.

A hydraulic pressure control unit according to the present invention is a hydraulic pressure control unit for a brake system mounted to a straddle-type vehicle and capable of executing anti-lock brake control. The hydraulic pressure control unit is configured to store a brake fluid that is released from a wheel cylinder during depressurization in the anti-lock brake control in an accumulator and to discharge the brake fluid in the accumulator to outside of the accumulator in a pumpless manner. The hydraulic pressure control unit includes: a base body formed with a master cylinder port to which a fluid pipe communicating with a master cylinder is connected, a wheel cylinder port to which a fluid pipe communicating with the wheel cylinder is connected, and an internal channel that communicates the master cylinder port and the wheel cylinder port with each other; an inlet valve that is provided to an inlet valve recess formed in the base body and opens/closes the internal channel during the anti-lock brake control; and an outlet valve that is provided to an outlet valve recess formed in the base body and opens/closes the internal channel during the anti-lock brake control. The master cylinder port is formed in a first surface of the base body, and the wheel cylinder port is formed in a second surface of the base body, the second surface opposing the first surface. The internal channel is configured not to be able to return the brake fluid in the accumulator to the master cylinder port without interposing the outlet valve. The inlet valve recess and the outlet valve recess are aligned in a direction in which the first surface and the second surface are aligned.

A brake system according to the present invention includes the hydraulic pressure control unit according to the present invention.

A straddle-type vehicle according to the present invention includes the brake system according to the present invention.

In the hydraulic pressure control unit according to the present invention, the master cylinder port is formed in the first surface of the base body, and the wheel cylinder port is formed in the second surface of the base body, the second surface opposing the first surface. In addition, in the hydraulic pressure control unit according to the present invention, the inlet valve recess and the outlet valve recess are aligned in the direction in which the first surface and the second surface are aligned. In the hydraulic pressure control unit according to the present invention, the base body can be formed such that a width thereof in a perpendicular direction to the direction in which the first surface and the second surface are aligned is reduced. Accordingly, when the hydraulic pressure control unit according to the present invention is held by a front fork such that the direction in which the first surface and the second surface are aligned corresponds to a vertical direction in a state where the straddle-type vehicle is seen in a front view, at least a part of the base body can be arranged between the front fork and a front wheel. Thus, in the hydraulic pressure control unit according to the present invention, a portion that is projected to the front fork side from a portion of the base body arranged between the front fork and the front wheel can at least partially be arranged at a position behind the front fork in the state where the straddle-type vehicle is seen in the front view. Therefore, when the straddle-type vehicle, to which the hydraulic pressure control unit according to the present invention is mounted, is seen in the front view, it is possible to reduce a region of the hydraulic pressure control unit arranged on an outer side of the front fork to be smaller than the related art, and it is thus possible to suppress the hydraulic pressure control unit from being applied with an external force in comparison with the related art.

BRIEF DESCRIPTION OF THE DRAWINGS

FIG. 1 is a view illustrating a schematic configuration of a pedal-driven vehicle to which a brake system according to an embodiment of the present invention is mounted.

FIG. 2 is a view illustrating a schematic configuration of the brake system according to the embodiment of the present invention.

FIG. 3 is a plan view of a hydraulic pressure control unit according to the embodiment of the present invention.

FIG. 4 is a perspective view of the hydraulic pressure control unit according to the embodiment of the present invention.

FIG. 5 is a side view of the hydraulic pressure control unit according to the embodiment of the present invention, and is also a partial cross-sectional view thereof.

FIG. 6 is a plan view of the hydraulic pressure control unit according to the embodiment of the present invention.

FIG. 7 is a perspective view of a base body of the hydraulic pressure control unit according to the embodiment of the present invention, and is also a transmissive view of inside thereof.

FIG. 8 is a perspective view of the base body of the hydraulic pressure control unit according to the embodiment of the present invention, and is also a transmissive view of the inside thereof.

FIG. 9 is a plan view of another example of the hydraulic pressure control unit according to the embodiment of the present invention.

FIG. 10 is a view for explaining a method for assembling a circuit board in the hydraulic pressure control unit according to the embodiment of the present invention.

DETAILED DESCRIPTION

A description will hereinafter be made on a hydraulic pressure control unit, a brake system, and a straddle-type vehicle according to the present invention with reference to the drawings.

The following description will be made on a case where the present invention is adopted for a pedal-driven vehicle (for example, a two-wheeled vehicle, a three-wheeled vehicle, or the like). However, the present invention may be adopted for a straddle-type vehicle other than the pedal-driven vehicle. Examples of the straddle-type vehicle other than the pedal-driven vehicle are a two-wheeled motor vehicle, a three-wheeled motor vehicle, and an all-terrain vehicle, each of which has at least one of an engine and an electric motor as a drive source. The pedal-driven vehicle means a vehicle in general that can travel forward on a road by a depressing force applied to pedals. That is, the pedal-driven vehicles include a normal pedal-driven vehicle, an electrically-assisted pedal-driven vehicle, an electric pedal-driven vehicle, and the like. Meanwhile, the two-wheeled motor vehicle and the three-wheeled motor vehicle each mean a so-called motorcycle, and the motorcycles include a bike, a scooter, an electric scooter, and the like.

A configuration, operation, and the like, which will be described below, constitute merely one example. Each of the hydraulic pressure control unit, the brake system, and the straddle-type vehicle according to the present invention is not limited to a case with such a configuration, such operation, and the like. For example, the following description will be made on a case where the brake system according to the present invention executes anti-lock brake control only for a braking force generated on a front wheel. However, the brake system according to the present invention may execute the anti-lock brake control only for a braking force generated on a rear wheel, or may execute the anti-lock brake control for both of the braking force generated to the front wheel and the braking force generated on the rear wheel.

In the drawings, the same or similar members or portions will be denoted by the same reference sign or will not be denoted by a reference sign. In addition, a detailed structure will appropriately be illustrated in a simplified manner or will not be illustrated. An overlapping description will appropriately be simplified or will not be made.

<Mounting of Brake System to Pedal-Driven Vehicle>

A description will be made on mounting of a brake system according to an embodiment to the pedal-driven vehicle.

FIG. 1 is a view illustrating a schematic configuration of the pedal-driven vehicle to which the brake system according to the embodiment of the present invention is mounted. FIG. 1 illustrates a case where a pedal-driven vehicle 200 is the two-wheeled vehicle. However, the pedal-driven vehicle 200 may be another pedal-driven vehicle such as the three-wheeled vehicle.

The pedal-driven vehicle 200 as an example of the straddle-type vehicle includes a frame 210, a turning section 230, a saddle 218, a pedal 219, a rear wheel 220, and a rear-wheel braking section 260.

For example, the frame 210 includes: a head tube 211 pivotally supporting a steering column 231 in the turning section 230; a top tube 212 and a down tube 213, each of which is coupled to the head tube 211; a seat tube 214 that is coupled to the top tube 212 and the down tube 213 and holds the saddle 218; and a stay 215 that is coupled to upper and lower ends of the seat tube 214 and holds the rear wheel 220 and the rear-wheel braking section 260.

The turning section 230 includes: the steering column 231; a handlebar stem 232 held by the steering column 231; a handlebar 233 held by the handlebar stem 232; a brake operation section 240 attached to the handlebar 233; a front fork 216 coupled to the steering column 231; a front wheel 217 held in a freely rotatable manner by the front fork 216; and a front-wheel braking section 250. The front fork 216 is provided to each side of the front wheel 217. One end of the front fork 216 is coupled to the steering column 231, and the other end thereof is connected to a center of rotation of the front wheel 217. That is, the front wheel 217 is held in the freely rotatable manner between a pair of the front forks 216. The front fork 216 may be a front fork with a suspension.

The brake operation section 240 includes: a mechanism used as an operation section of the front-wheel braking section 250; and a mechanism used as an operation section of the rear-wheel braking section 260. For example, the mechanism used as the operation section of the front-wheel braking section 250 is disposed on a right end side of the handlebar 233, and the mechanism used as the operation section of the rear-wheel braking section 260 is disposed on a left end side of the handlebar 233.

A hydraulic pressure control unit 1 is held by the front fork 216 in the turning section 230. The hydraulic pressure control unit 1 is a unit that controls a pressure of a brake fluid in the front-wheel braking section 250. The rear-wheel braking section 260 may be a braking section of a type that generates a braking force by increasing the pressure of the brake fluid, or may be of a braking section of a type that mechanically generates the braking force (for example, the braking section of a type that generates the braking force by generating a tensile force on a wire, or the like).

For example, a power supply unit 270 that serves as a power supply for the hydraulic pressure control unit 1 is attached to the down tube 213 of the frame 210. The power supply unit 270 may be a battery or a generator. Examples of the generator are: a generator that generates electrical power by travel of the pedal-driven vehicle 200 (for example, a hub dynamo that generates the electrical power by rotation of the front wheel 217 or the rear wheel 220, a generator that also serves as a motor for a drive source of the front wheel 217 or the rear wheel 220 and generates regenerative power, or the like); and a generator that generates the electric power by sunlight.

That is, a brake system 100 is mounted to the pedal-driven vehicle 200, and the brake system 100 at least includes the brake operation section 240, the front-wheel braking section 250, the hydraulic pressure control unit 1, and the power supply unit 270. The brake system 100 can execute anti-lock brake control by controlling the pressure of the brake fluid in the front-wheel braking section 250 with the hydraulic pressure control unit 1.

<Configuration of Brake System>

A description will be made on a configuration of the brake system according to the embodiment.

FIG. 2 is a view illustrating a schematic configuration of the brake system according to the embodiment of the present invention.

The hydraulic pressure control unit 1 includes a base body 10. The base body 10 is formed with a master cylinder port 11, a wheel cylinder port 12, and an internal channel 13 that communicates the master cylinder port 11 and the wheel cylinder port 12 with each other.

The internal channel 13 is a channel for the brake fluid. The internal channel 13 includes a first channel 14, a second channel 15, a third channel 16, and a fourth channel 17. The master cylinder port 11 and the wheel cylinder port 12 communicate with each other via the first channel 14 and the second channel 15. In addition, an end portion on an inlet side of the third channel 16 is connected to an intermediate portion of the second channel 15.

The brake operation section 240 is connected to the master cylinder port 11 via a fluid pipe 101. The brake operation section 240 includes a brake lever 241, a master cylinder 242, and a reservoir 243. The master cylinder 242 includes a piston section (not illustrated) that moves in an interlocking manner with an operation of the brake lever 241 by a user, and is connected to an inlet side of the first channel 14 via the fluid pipe 101 and the master cylinder port 11. In other words, the fluid pipe 101 that communicates with the master cylinder 242 is connected to the master cylinder port 11. With movement of the piston section, the pressure of the brake fluid in the first channel 14 is increased or reduced. The reservoir 243 stores the brake fluid for the master cylinder 242.

The front-wheel braking section 250 is connected to the wheel cylinder port 12 via a fluid pipe 102. The front-wheel braking section 250 includes a wheel cylinder 251 and a rotor 252. The wheel cylinder 251 is attached to a lower end portion of the front fork 216. The wheel cylinder 251 includes a piston section (not illustrated) that moves in an interlocking manner with a pressure in the fluid pipe 102, and is connected to an outlet side of the second channel 15 via the fluid pipe 102 and the wheel cylinder port 12. In other words, the fluid pipe 102 that communicates with the wheel cylinder 251 is connected to the wheel cylinder port 12. The rotor 252 is held by the front wheel 217 and rotates with the front wheel 217. When a brake pad (not illustrated) is pressed against the rotor 252 due to movement of the piston section, the front wheel 217 brakes.

The hydraulic pressure control unit 1 also includes an inlet valve 31 and an outlet valve 32, each of which opens/closes the internal channel 13. The inlet valve 31 and the outlet valve 32 are provided to the base body 10. More specifically, the inlet valve 31 is provided between an outlet side of the first channel 14 and an inlet side of the second channel 15 and allows/blocks a flow of the brake fluid between the first channel 14 and the second channel 15. The outlet valve 32 is provided between an outlet side of the third channel 16 and an inlet side of a fourth channel 17 and allows/blocks a flow of the brake fluid between the third channel 16 and the fourth channel 17. The pressure of the brake fluid is controlled by opening/closing operation of the inlet valve 31 and the outlet valve 32. The brake system 100 according to this embodiment is a brake system of a single system that executes the anti-lock brake control only for the braking force generated on the front wheel. Thus, in this embodiment, only a pair of the inlet valve 31 and the outlet valve 32 is provided to the base body 10.

The hydraulic pressure control unit 1 includes: a first coil 61 as a drive source of the inlet valve 31; and a second coil 62 as a drive source of the outlet valve 32. For example, when the first coil 61 is in an unenergized state, the inlet valve 31 allows a bidirectional flow of the brake fluid. Then, when the first coil 61 is energized, the inlet valve 31 is brought into a closed state and blocks the flow of the brake fluid. That is, in this embodiment, the inlet valve 31 is an electromagnetic valve that is opened when not energized. In addition, for example, when the second coil 62 is in an unenergized state, the outlet valve 32 blocks the flow of the brake fluid. Then, when the second coil 62 is energized, the outlet valve 32 is brought into an open state and allows the bidirectional flow of the brake fluid. That is, in this embodiment, the outlet valve 32 is an electromagnetic valve that is closed when not energized.

The hydraulic pressure control unit 1 includes an accumulator 33. The accumulator 33 is connected to an outlet side of the fourth channel 17 and stores the brake fluid that has flowed through the outlet valve 32.

The hydraulic pressure control unit 1 includes a pressure sensor 103 that detects the pressure of the brake fluid. The pressure sensor 103 is provided to the base body 10. In this embodiment, the pressure sensor 103 detects the pressure of the brake fluid in the wheel cylinder 251. The pressure sensor 103 communicates with the second channel 15.

The hydraulic pressure control unit 1 includes a control section 35. The control section 35 receives signals from various sensors such as the pressure sensor 103 and a wheel rotational frequency sensor (not illustrated) that detects a rotational frequency of the front wheel 217. Portions of the control section 35 may be disposed collectively or may be disposed separately. The control section 35 may be configured by including a microcomputer, a microprocessor unit, or the like, may be configured by including a member in which firmware and the like can be updated, or may be configured by including a program module or the like that is executed by a command from a CPU or the like, for example.

The control section 35 controls the energization of the first coil 61 and the second coil 62. In detail, the control section 35 controls the energization of the first coil 61 and thereby controls driving (the opening/closing operation) of the inlet valve 31. In addition, the control section 35 controls the energization of the second coil 62 and thereby controls driving (the opening/closing operation) of the outlet valve 32. That is, by controlling the opening/closing operation of the inlet valve 31 and the outlet valve 32, the control section 35 controls the pressure of the brake fluid in the wheel cylinder 251, that is, the braking force on the front wheel 217.

In this embodiment, the control section 35 includes a circuit board 36 as will be described below. The circuit board 36 is electrically connected to the first coil 61 and the second coil 62 and controls the energization of the first coil 61 and the second coil 62. That is, by controlling the energization of the first coil 61 and the second coil 62, the circuit board 36 controls driving of the inlet valve 31 and the outlet valve 32.

For example, in the case where the control section 35 determines that the front wheel 217 is locked or possibly locked on the basis of the signal from the wheel rotational frequency sensor (not illustrated) at the time when the front wheel 217 brakes due to the operation of the brake lever 241 by the user, the control section 35 initiates the anti-lock brake control.

Once initiating the anti-lock brake control, the control section 35 brings the first coil 61 into an energized state, closes the inlet valve 31, and blocks the flow of the brake fluid from the master cylinder 242 to the wheel cylinder 251, so as to prevent an increase in the pressure of the brake fluid in the wheel cylinder 251. Meanwhile, the control section 35 brings the second coil 62 into an energized state, opens the outlet valve 32, and allows the flow of the brake fluid from the wheel cylinder 251 to the accumulator 33, so as to reduce the pressure of the brake fluid in the wheel cylinder 251. In this way, the front wheel 217 is unlocked, or locking thereof is avoided. In the case where the control section 35 determines, on the basis of the signal from the pressure sensor 103, that the pressure of the brake fluid in the wheel cylinder 251 is reduced to a specified value, the control section 35 brings the second coil 62 into the unenergized state to close the outlet valve 32, and brings the first coil 61 into the unenergized state to open the inlet valve 31 for a short period of time, so as to increase the pressure of the brake fluid in the wheel cylinder 251. The control section 35 may increase/reduce the pressure of the brake fluid in the wheel cylinder 251 once or may repeatedly increase/reduce the pressure of the brake fluid in the wheel cylinder 251 for a plurality of times.

When the anti-lock brake control is terminated and the brake lever 241 returns, the inside of the master cylinder 242 is brought into an atmospheric pressure state, and the brake fluid in the wheel cylinder 251 returns. In addition, when the anti-lock brake control is terminated and the brake lever 241 returns, the outlet valve 32 is brought into the open state. When the pressure of the brake fluid in the internal channel 13 becomes lower than the pressure of the brake fluid stored in the accumulator 33, the brake fluid stored in the accumulator 33 is discharged to the outside of the accumulator 33 without increasing the pressure thereof (that is, in a pumpless manner). Then, the brake fluid that has been discharged to the outside of the accumulator 33 sequentially flows through the fourth channel 17, the outlet valve 32, the third channel 16, the second channel 15, the inlet valve 31, and the first channel 14, then flows through the master cylinder port 11 and the fluid pipe 101, and returns to the master cylinder 242. That is, the hydraulic pressure control unit 1 according to this embodiment is configured to store the brake fluid that is released from the wheel cylinder 251 during depressurization in the anti-lock brake control in the accumulator 33 and to discharge the brake fluid in the accumulator 33 to the outside of the accumulator 33 in the pumpless manner. In addition, the internal channel 13 is configured not to be able to return the brake fluid in the accumulator 33 to the master cylinder port 11 without interposing the outlet valve 32.

<Configuration of Hydraulic Pressure Control Unit>

A description will be made on a configuration of the hydraulic pressure control unit for the brake system according to the embodiment.

A description will hereinafter be made on a configuration of the hydraulic pressure control unit 1 while the hydraulic pressure control unit 1 is observed such that an extending direction of an axis 216a of the front fork 216 corresponds to a vertical direction of the hydraulic pressure control unit 1 in a state where the hydraulic pressure control unit 1 is held by the front fork 216 of the pedal-driven vehicle 200.

FIG. 3 is a plan view of the hydraulic pressure control unit according to the embodiment of the present invention. This FIG. 3 illustrates, together with the hydraulic pressure control unit 1, the front wheel 217 and the front fork 216 that holds the hydraulic pressure control unit 1. In FIG. 3, a left side of the sheet corresponds to a front side of the pedal-driven vehicle 200. That is, a state where the pedal-driven vehicle 200, to which the hydraulic pressure control unit 1 is mounted, is seen in a front view is a state where the hydraulic pressure control unit 1, the front fork 216, and the front wheel 217 are observed from the left side of the sheet of FIG. 3.

FIG. 4 is a perspective view of the hydraulic pressure control unit according to the embodiment of the present invention. FIG. 5 is a side view of the hydraulic pressure control unit according to the embodiment of the present invention, and is also a partial cross-sectional view thereof. Here, FIG. 5 is a partial cross-sectional side view in which the hydraulic pressure control unit 1 is observed in an arrow A direction illustrated in FIG. 4. In addition, in FIG. 5, the second channel 15 of the internal channel 13 is located in front of a cross-sectional portion. Accordingly, FIG. 5 illustrates a part of the second channel 15 by two-dot chain lines as imaginary lines. FIG. 6 is a plan view of the hydraulic pressure control unit according to the embodiment of the present invention. Each of FIG. 7 and FIG. 8 is a perspective view of the base body of the hydraulic pressure control unit according to the embodiment of the present invention, and is also a transmissive view of the inside thereof. In detail, FIG. 7 is a view in which the base body 10 is observed in an arrow B direction illustrated in FIG. 4. FIG. 8 is a view in which the base body 10 is observed in an arrow C direction illustrated in FIG. 4. In order to facilitate view of the internal channel 13 in the base body 10, a female screw 27a that is formed in a front surface 27 of the base body 10 is not illustrated in FIG. 7 and FIG. 8.

A description will herein be made on the configuration of the hydraulic pressure control unit 1 according to this embodiment with reference to FIG. 3 to FIG. 8. In the description on the configuration of the hydraulic pressure control unit 1, a connection direction X, a width direction Y, and an axial direction Z illustrated in FIG. 4 are defined as follows. The connection direction X is a connection direction of a housing, which will be described later, to the base body. The width direction Y is a perpendicular direction to the connection direction X. The width direction Y is also a direction in which the front fork 216 and the front wheel 217 oppose each other, and indicates a lateral width of the hydraulic pressure control unit 1. The axial direction Z is a parallel direction with the axis 216a of the front fork 216. The axial direction Z is also a perpendicular direction to the width direction Y. In detail, the axial direction Z is a direction that is perpendicular to the connection direction X and is perpendicular to the width direction Y. An upper surface 25 and a lower surface 26, each of which will be described later, in the base body 10 are aligned in the axial direction Z. Thus, it can also be said that the axial direction Z is a direction in which the upper surface 25 and the lower surface 26 are aligned.

The hydraulic pressure control unit 1 includes the base body 10, the inlet valve 31, the outlet valve 32, the first coil 61, the second coil 62, the circuit board 36, and a housing 40.

The base body 10 is a substantially rectangular-parallelepiped member, and an aluminum alloy is used as a material therefor, for example. Each of the surfaces of the base body 10 may be flat, may include a curved portion, or may include a step. As described above, the base body 10 is formed with the master cylinder port 11, the wheel cylinder port 12, and the internal channel 13 that communicates the master cylinder port 11 and the wheel cylinder port 12 with each other. The base body 10 is also formed with: an inlet valve recess 18 to which the inlet valve 31 is provided; and an outlet valve recess 19 to which the outlet valve 32 is provided.

As illustrated in FIG. 7 and FIG. 8, the master cylinder port 11 is formed in the upper surface 25 of the base body 10. The inlet valve recess 18 is formed to be opened to a rear surface 28 of the base body 10. The inlet valve recess 18 includes a first recess 18a and a second recess 18b. The first recess 18a is a recess that is opened to the rear surface 28 of the base body 10 and has a substantially cylindrical shape. The second recess 18b is arranged on the front surface 27 side of the base body 10 from the first recess 18a. The second recess 18b has a substantially cylindrical shape with a smaller diameter than the first recess 18a, and communicates with a bottom portion of the first recess 18a. The master cylinder port 11 and the second recess 18b of the inlet valve recess 18 are connected to each other by the first channel 14 of the internal channel 13.

The second channel 15 of the internal channel 13 is connected to the first recess 18a of the inlet valve recess 18. Although the first recess 18a and the second channel 15 may directly be connected to each other, in this embodiment, the first recess 18a and the second channel 15 are connected to each other via an inlet valve notch 23. The inlet valve notch 23 is formed in an inner circumferential surface of the first recess 18a in a manner to be recessed outward. An upper end portion 23a of the inlet valve notch 23 is located lower than an upper end portion 18c of the inner circumferential surface of the first recess 18a.

The outlet valve recess 19 is formed to be opened to the rear surface 28 of the base body 10. The outlet valve recess 19 and the inlet valve recess 18 are aligned in the axial direction Z. The outlet valve recess 19 includes a first recess 19a and a second recess 19b. The first recess 19a is a recess that is opened to the rear surface 28 of the base body 10 and has a substantially cylindrical shape. The second recess 19b is arranged on the front surface 27 side of the base body 10 from the first recess 19a. The second recess 19b has a substantially cylindrical shape with a smaller diameter than the first recess 19a, and communicates with a bottom portion of the first recess 19a.

The first recess 19a of the outlet valve recess 19 and the first recess 18a of the inlet valve recess 18 are connected to each other by the second channel 15 of the internal channel 13. That is, a connected portion between the first recess 19a of the outlet valve recess 19 and the second channel 15 of the internal channel 13 functions as the third channel 16 illustrated in FIG. 2. In the second channel 15, a portion that connects the inlet valve recess 18 and the outlet valve recess 19 serves as a channel that extends linearly. In addition, the second channel 15 is connected to the wheel cylinder port 12 formed in the lower surface 26 (a surface opposing the upper surface 25) of the base body 10. That is, the master cylinder port 11 and the wheel cylinder port 12 are separately formed in the upper surface 25 and the lower surface 26, respectively. In other words, the master cylinder port 11 and the wheel cylinder port 12 are separately formed in a pair of side surfaces that oppose each other in the axial direction Z. In the second channel 15, a portion that connects the inlet valve recess 18, the outlet valve recess 19, and the wheel cylinder port 12 also serves as a channel that extends linearly. Although the first recess 19a of the outlet valve recess 19 and the second channel 15 may directly be connected to each other, in this embodiment, the first recess 19a and the second channel 15 are connected to each other via an outlet valve notch 24. The outlet valve notch 24 is formed in an inner circumferential surface of the first recess 19a in a manner to be recessed outward. An upper end portion 24a of the outlet valve notch 24 is located lower than an upper end portion 19c of the inner circumferential surface of the first recess 19a.

The base body 10 according to this embodiment is formed with a pressure sensor recess 22 to which the pressure sensor 103 is provided. The pressure sensor recess 22 is formed to be opened to the rear surface 28 of the base body 10. The inlet valve recess 18, the outlet valve recess 19, and the pressure sensor recess 22 are aligned in the axial direction Z. The pressure sensor recess 22 communicates with a portion of the second channel 15 in the internal channel 13, the portion connecting the outlet valve recess 19 and the wheel cylinder port 12. That is, the pressure sensor 103 communicates with the portion, which connects the outlet valve recess 19 and the wheel cylinder port 12, in the second channel 15 of the internal channel 13.

The accumulator 33 is formed in the lower surface 26 of the base body 10. The accumulator 33 is connected to the second recess 19b of the outlet valve recess 19 by the fourth channel 17 of the internal channel 13.

As illustrated in FIG. 5, the first recess 18a of the inlet valve recess 18 is provided with the inlet valve 31 that is freely slidable in the connection direction X as an axial direction of the first recess 18a. The inlet valve 31 is partially projected rearward from the rear surface 28 of the base body 10. In addition, the first coil 61 is erected from the rear surface 28 of the base body 10. The first coil 61 is provided in a manner to surround a portion of the inlet valve 31 that is projected rearward from the rear surface 28 of the base body 10. That is, similar to the axes of the first recess 18a and the inlet valve 31, an axis 61a of the first coil 61 extends in the connection direction X. A terminal 63 is provided to a top surface 61b of the first coil 61. The first coil 61 is electrically connected to the circuit board 36, which is arranged behind the first coil 61, via this terminal 63. In this embodiment, the terminal 63 that is formed by bending is used. The terminal 63 is formed just as described. In this way, even in the case where a position of the terminal 63 and a position of an insertion hole for the terminal 63 in the circuit board 36 are misaligned from each other, deformation of the terminal 63 can cancel the misalignment therebetween. As a result, it is easy to electrically connect the terminal 63 to the circuit board 36.

By controlling the energization of the first coil 61 from the circuit board 36, the inlet valve 31 slides in the connection direction X within the first recess 18a of the inlet valve recess 18. In this way, the inlet valve 31 opens/closes a channel between the first recess 18a and the second recess 18b of the inlet valve recess 18. As a result, when the channel between the first recess 18a and the second recess 18b is opened, as illustrated in FIG. 7, the brake fluid can flow from the master cylinder 242 to the wheel cylinder 251 via the first channel 14 and the second channel 15. Meanwhile, when the channel between the first recess 18a and the second recess 18b is closed, as illustrated in FIG. 7, the flow of the brake fluid from the master cylinder 242 to the wheel cylinder 251 is blocked.

As illustrated in FIG. 5, the first recess 19a of the outlet valve recess 19 is provided with the outlet valve 32 that is freely slidable in the connection direction X as an axial direction of the first recess 19a. The outlet valve 32 is partially projected rearward from the rear surface 28 of the base body 10. In addition, the second coil 62 is erected from the rear surface 28 of the base body 10. The second coil 62 is provided in a manner to surround a portion of the outlet valve 32 that is projected rearward from the rear surface 28 of the base body 10. That is, similar to the axes of the first recess 19a and the outlet valve 32, an axis 62a of the second coil 62 extends in the connection direction X. A terminal 64 is provided to a top surface 62b of the second coil 62. The second coil 62 is electrically connected to the circuit board 36, which is arranged behind the second coil 62, via this terminal 64. In this embodiment, the terminal 64 that is formed by bending is used. The terminal 64 is formed just as described. In this way, even in the case where a position of the terminal 64 and a position of an insertion hole for the terminal 64 in the circuit board 36 are misaligned from each other, deformation of the terminal 64 can cancel the misalignment therebetween. As a result, it is easy to electrically connect the terminal 64 to the circuit board 36.

By controlling the energization of the second coil 62 from the circuit board 36, the outlet valve 32 slides in the connection direction X within the first recess 19a of the outlet valve recess 19. In this way, the outlet valve 32 opens/closes a channel between the first recess 19a and the second recess 19b of the outlet valve recess 19. As a result, when the channel between the first recess 19a and the second recess 19b is opened, as illustrated in FIG. 7, the brake fluid can flow from the wheel cylinder 251 to the accumulator 33 via the second channel 15 and the fourth channel 17.

Here, as described above, the inlet valve recess 18 and the outlet valve recess 19 are aligned in the axial direction Z. Accordingly, the first coil 61, which is provided in the manner to surround the portion of the inlet valve 31 provided to the inlet valve recess 18, and the second coil 62, which is provided in the manner to surround the portion of the outlet valve 32 provided to the outlet valve recess 19, are aligned in the axial direction Z. In addition, as described above, the inlet valve recess 18, the outlet valve recess 19, and the pressure sensor recess 22 are aligned in the axial direction Z. Accordingly, the first coil 61, the second coil 62, and the pressure sensor 103, which is provided to the pressure sensor recess 22, are aligned in the axial direction Z.

As illustrated in FIG. 5, the housing 40 accommodates the inlet valve 31, the outlet valve 32, the first coil 61, the second coil 62, and the circuit board 36. For example, the housing 40 has a substantially rectangular-parallelepiped box shape. Each surface of the housing 40 may be flat, may include a curved portion, or may include a step. In this embodiment, the housing 40 is formed of a resin. A front surface 43 of the housing 40 is connected to the rear surface 28 of the base body 10. That is, the first coil 61 and the second coil 62 described above are erected from the surface, to which the housing 40 is connected, in the base body 10.

As illustrated in FIG. 4, FIG. 6, and the like, a dimension in the width direction Y of the housing 40 is greater than a dimension in the width direction Y of the base body 10. Here, the housing 40 includes a pair of side surfaces that oppose each other in the width direction Y. Hereinafter, one of these side surfaces will be described as a first side surface 45, and the other of these side surfaces will be described as a second side surface 46. In the case where the first side surface 45 and the second side surface 46 are defined just as described, in a state where the hydraulic pressure control unit 1 is seen in the connection direction X, a center in the width direction Y of the base body 10 is located on the first side surface 45 side from a center in the width direction Y of the housing 40.

When the hydraulic pressure control unit 1 is configured as described above, a projection amount in the width direction Y of the housing 40 with respect to the base body 10 is smaller on the first side surface 45 side than on the second side surface 46 side. Accordingly, as it is understood from FIG. 3, the first side surface 45 of the housing 40 opposes the front wheel 217, and the hydraulic pressure control unit 1 is held by the front fork 216. In this way, at least a part of the base body 10 can easily be arranged between the front fork 216 and the front wheel 217.

In this embodiment, the second side surface 46 includes an inclined section 47, a dimension in the width direction Y of which is reduced toward the base body 10. However, a shape of the second side surface 46 is not limited to such a shape.

FIG. 9 is a plan view of another example of the hydraulic pressure control unit according to the embodiment of the present invention.

As illustrated in FIG. 9, the second side surface 46 may be formed in a step shape, for example. Even when the second side surface 46 is formed just as described, the first side surface 45 of the housing 40 opposes the front wheel 217, and the hydraulic pressure control unit 1 is held by the front fork 216. In this way, at least the part of the base body 10 can easily be arranged between the front fork 216 and the front wheel 217. However, since the second side surface 46 includes the inclined section 47, a clearance between the second side surface 46 and the front fork 216 can be reduced. Thus, it is possible to increase accommodation capacity of the housing 40.

As illustrated in FIG. 4 to FIG. 6, the housing 40 according to this embodiment includes a body 51 and a lid 58. A front surface of the body 51 is connected to the rear surface 28 of the base body 10. In addition, in the body 51, an opening 52 is formed in a surface that opposes the surface connected to the base body 10, that is, a rear surface of the body 51. The lid 58 is a member that covers the opening 52 of the body 51. That is, the lid 58 constitutes a rear surface 44 of the housing 40.

In the body 51 according to this embodiment, a side 53 on the first side surface 45 side that is a part of a peripheral edge of the opening 52 and a side 54 that is another part of the opening 52 and opposes the side 53 in the peripheral edge of the opening 52 establish a positional relationship illustrated in FIG. 6 in the connection direction X. More specifically, in the connection direction X, the side 53 is located on a side near the base body 10 from the circuit board 36. Meanwhile, the side 54 is located on a side farther from the base body 10 than the side 53. The side 53 and the side 54 are arranged at such positions for the following reason.

FIG. 10 is a view for explaining a method for assembling the circuit board in the hydraulic pressure control unit according to the embodiment of the present invention.

An assembly body in which the inlet valve 31, the outlet valve 32, the first coil 61, the second coil 62, and the body 51 of the housing 40 are connected to the base body 10 is prepared, and the circuit board 36 is assembled to the assembly body in a state where the assembly body is held in such a posture that the front surface 27 of the base body 10 becomes the lower surface. At this time, when the circuit board 36 is assembled to the assembly body, a jig 75 may be arranged below the circuit board 36. For example, in the case of this embodiment, as described above, the terminal 63 and the terminal 64, each of which is formed by bending, are used. In such a case, when the terminal 63 and the terminal 64 are inserted in the insertion holes of the circuit board 36, the jig 75 that supports the terminal 63 and the terminal 64 is arranged below the circuit board 36 so as to prevent an excessive load from being applied to the terminal 63 and the terminal 64.

In order to arrange the jig 75 below the circuit board 36, a portion, which opposes the jig 75, in the peripheral edge of the opening 52 of the body 51 has to be arranged at a position below the jig 75 in FIG. 10. At this time, in the case where the entire peripheral edge of the opening 52 of the body 51 is arranged at an equal distance from the base body 10 in the connection direction X, an inclination angle of the inclined section 47 to the connection direction X is increased. In other words, in FIG. 3, the inclined section 47 comes closer to the front fork 216. In addition, in the case where the second side surface 46 of the housing 40 is configured as illustrated in FIG. 9, the portion of the housing 40 that is projected to the second side surface 46 side from the base body 10 comes closer to the base body 10 than the portion at the position illustrated in FIG. 10. As illustrated in FIG. 3, when the pedal-driven vehicle 200, to which the hydraulic pressure control unit 1 is mounted, is seen in the front view, the portion of the housing 40 that is projected to the second side surface 46 side from the base body 10 is arranged behind the front fork 216. Accordingly, in the case where the entire peripheral edge of the opening 52 of the body 51 is arranged at the equal distance from the base body 10 in the connection direction X, in order to arrange the portion of the housing 40, which is projected to the second side surface 46 side from the base body 10, behind the front fork 216, it is necessary to increase a length in the connection direction X of the hydraulic pressure control unit 1 to be longer than that in states illustrated in FIG. 4 and FIG. 9. That is, in the case where the entire peripheral edge of the opening 52 of the body 51 is arranged at the equal distance from the base body 10 in the connection direction X, the hydraulic pressure control unit 1 is enlarged in comparison with the hydraulic pressure control unit 1 in each of the states illustrated in FIG. 4 and FIG. 9.

Meanwhile, when the side 53 and the side 54 are arranged as in this embodiment, the jig 75 can be arranged below the circuit board 36. In addition, compared to the case where the entire peripheral edge of the opening 52 of the body 51 is arranged at the equal distance from the base body 10 in the connection direction X, it is possible to suppress an increase in the inclination angle of the inclined section 47 to the connection direction X. In the case where the second side surface 46 of the housing 40 is configured as illustrated in FIG. 9, the jig 75 can be arranged below the circuit board 36 by arranging the side 53 and the side 54 as in this embodiment. In addition, compared to the case where the entire peripheral edge of the opening 52 of the body 51 is arranged at the equal distance from the base body 10 in the connection direction X, it is possible to suppress the portion of the housing 40 that is projected to the second side surface 46 side from the base body 10 from approaching the base body 10. That is, when the side 53 and the side 54 are arranged as in this embodiment, the jig 75 can be arranged below the circuit board 36. In addition, compared to the case where the entire peripheral edge of the opening 52 of the body 51 is arranged at the equal distance from the base body 10 in the connection direction X, it is possible to downsize the hydraulic pressure control unit 1.

In this embodiment, in the peripheral edge of the opening 52 of the body 51, a side 55 that connects the side 53 and the side 54 has a linear shape. That is, the side 53 is continuously connected to the side 54. However, the side 55 is not limited to have the linear shape and may have a step shape, for example. Here, by continuously connecting the side 53 to the side 54, it is possible to prevent a clearance from being formed between the peripheral edge of the opening 52 of the body 51 and the lid 58. Accordingly, by continuously connecting the side 53 to the side 54, it is possible to improve airtightness between the peripheral edge of the opening 52 of the body 51 and the lid 58.

The hydraulic pressure control unit 1 includes a connector 48 in the housing 40, and the connector 48 is electrically connected to the circuit board 36. The connector 48 is connected to cables that include signal wires (not illustrated) for the various sensors such as the pressure sensor 103 and the wheel rotational frequency sensor (not illustrated) for detecting the rotational frequency of the front wheel 217, a power wire (not illustrated) extending from the power supply unit 270, and the like. Here, as illustrated in FIG. 3 to FIG. 6, in this embodiment, the connector 48 is provided to at least one of an upper surface 41 and a lower surface 42 of the housing 40. In other words, the connector 48 is arranged to at least one of the paired side surfaces that oppose each other in the axial direction Z in the housing 40. In this embodiment, an example in which the connector 48 is provided to each of the upper surface 41 and the lower surface 42 of the housing 40 is described.

In this embodiment, as illustrated in FIG. 3, the hydraulic pressure control unit 1 is held by the front fork 216 and is mounted to the pedal-driven vehicle 200. More specifically, as illustrated in FIG. 4, the front surface 27 of the base body 10 is formed with the female screw 27a. Meanwhile, as illustrated in FIG. 3, the front fork 216 includes a bracket 70 that is projected toward the front wheel 217. When a bolt 71 that is inserted in an unillustrated through hole of the bracket 70 is screwed to the female screw 27a of the hydraulic pressure control unit 1, the hydraulic pressure control unit 1 is held by the front fork 216. The configuration of holding the hydraulic pressure control unit 1 by the front fork 216 is not limited to the configuration illustrated in FIG. 3. For example, the hydraulic pressure control unit 1 may be held by the front fork 216 using a holding member, such as a fixing belt, that is a different component from the front fork 216.

Here, as it is understood from FIG. 3 to FIG. 6, in the state where the pedal-driven vehicle 200 to which the hydraulic pressure control unit 1 is mounted is seen in the front view, the circuit board 36 is located behind the front fork 216 and the base body 10. In addition, the first coil 61 and the second coil 62 are erected from the rear surface 28 of the base body 10. In other words, in a state where the pedal-driven vehicle 200 to which the hydraulic pressure control unit 1 is mounted is observed in a direction of the axis 216a of the front fork 216, the circuit board 36 is located behind the front fork 216 and the base body 10. In addition, the first coil 61 and the second coil 62 are erected from the rear surface 28 of the base body 10.

As illustrated in FIG. 3, in the state where the hydraulic pressure control unit 1 is mounted to the pedal-driven vehicle 200, at least the part of the base body 10 is located between the front fork 216 and the front wheel 217. In this embodiment, the entire base body 10 is located between the front fork 216 and the front wheel 217.

As illustrated in FIG. 3, in this embodiment, in the state where the pedal-driven vehicle 200 to which the hydraulic pressure control unit 1 is mounted is seen in the front view, the base body 10 does not have a region that is located in front of the front fork 216. In other words, in the state where the pedal-driven vehicle 200 to which the hydraulic pressure control unit 1 is mounted is observed in the direction of the axis 216a of the front fork 216, the base body 10 does not have the region that is located in front of the front fork 216.

As illustrated in FIG. 3, in this embodiment, in the state where the pedal-driven vehicle 200 to which the hydraulic pressure control unit 1 is mounted is seen in the front view, the base body 10 does not have a region that is located on an opposite side of the front fork 216 from the front wheel 217. In other words, in the state where the pedal-driven vehicle 200 to which the hydraulic pressure control unit 1 is mounted is observed in the direction of the axis 216a of the front fork 216, the base body 10 does not have the region that is located on the opposite side of the front fork 216 from the front wheel 217. Further in other words, in the state where the pedal-driven vehicle 200 to which the hydraulic pressure control unit 1 is mounted is seen in the front view, the base body 10 does not have a region that is arranged on an outer side of the front fork 216.

As illustrated in FIG. 3, in this embodiment, in the state where the pedal-driven vehicle 200 to which the hydraulic pressure control unit 1 is mounted is seen in the front view, the axis 61a of the first coil 61 and the axis 62a of the second coil 62 are located on a closer side to the front wheel 217 than the axis 216a of the front fork 216. In other words, in the state where the pedal-driven vehicle 200 to which the hydraulic pressure control unit 1 is mounted is observed in the direction of the axis 216a of the front fork 216, the axis 61a of the first coil 61 and the axis 62a of the second coil 62 are located on the closer side to the front wheel 217 than the axis 216a of the front fork 216.

As illustrated in FIG. 3, in this embodiment, in the state where the pedal-driven vehicle 200 to which the hydraulic pressure control unit 1 is mounted is seen in the front view, the base body 10 does not have a region that is located on an opposite side of the housing 40 from the front wheel 217. In other words, in the state where the pedal-driven vehicle 200 to which the hydraulic pressure control unit 1 is mounted is observed in the direction of the axis 216a of the front fork 216, the base body 10 does not have the region that is located on an opposite side of the housing 40 from the front wheel 217. That is, in the state where the pedal-driven vehicle 200 to which the hydraulic pressure control unit 1 is mounted is seen in the front view, the base body 10 does not have a portion that is projected to the front fork 216 side from the housing 40.

<Effects of Hydraulic Pressure Control Unit>

A description will be made on effects of the hydraulic pressure control unit according to the embodiment.

The hydraulic pressure control unit 1 according to this embodiment is the hydraulic pressure control unit 1 for the brake system 100 mounted to the pedal-driven vehicle 200 and capable of executing the anti-lock brake control. The hydraulic pressure control unit 1 is configured to store the brake fluid that is released from the wheel cylinder 251 during the depressurization in the anti-lock brake control in the accumulator 33 and to discharge the brake fluid in the accumulator 33 to the outside of the accumulator 33 in the pumpless manner. The hydraulic pressure control unit 1 includes the base body 10. The base body 10 is formed with: the master cylinder port 11, to which the fluid pipe 101 communicating with the master cylinder 242 is connected; the wheel cylinder port 12, to which the fluid pipe 102 communicating with the wheel cylinder 251 is connected; and the internal channel 13, which communicates the master cylinder port 11 and the wheel cylinder port 12 with each other. The hydraulic pressure control unit 1 also includes: the inlet valve 31 that is provided to the inlet valve recess 18 formed in the base body 10 and opens/closes the internal channel 13 during the anti-lock brake control; and the outlet valve 32 that is provided to the outlet valve recess 19 formed in the base body 10 and opens/closes the internal channel 13 during the anti-lock brake control. The master cylinder port 11 is formed in the upper surface 25 of the base body 10. The wheel cylinder port 12 is formed in the lower surface 26, which opposes the upper surface 25, in the base body 10. The internal channel 13 is configured not to be able to return the brake fluid in the accumulator 33 to the master cylinder port 11 without interposing the outlet valve 32. In addition, the inlet valve recess 18 and the outlet valve recess 19 are aligned in the axial direction Z that is the direction in which the upper surface 25 and the lower surface 26 are aligned. Here, the upper surface 25 corresponds to the first surface of the present invention, and the lower surface 26 corresponds to the second surface of the present invention.

In the hydraulic pressure control unit 1 according to this embodiment, the base body 10 can be formed such that the dimension thereof in the width direction Y is reduced, and the width direction Y is the perpendicular direction to the direction in which the upper surface 25 and the lower surface 26 are aligned. Accordingly, at least the part of the base body 10 can be arranged between the front fork 216 and the front wheel 217. Thus, in the hydraulic pressure control unit 1, the portion that is projected to the front fork 216 side from the portion of the base body 10 arranged between the front fork 216 and the front wheel 217 can at least partially be arranged at the position behind the front fork 216 in the state where the pedal-driven vehicle 200 is seen in the front view. Therefore, when the pedal-driven vehicle 200 to which the hydraulic pressure control unit 1 according to this embodiment is mounted is seen in the front view, it is possible to reduce the region of the hydraulic pressure control unit 1 that is arranged on the outer side of the front fork 216 to be smaller than the related art, and it is thus possible to suppress the hydraulic pressure control unit 1 from being applied with the external force in comparison with the related art. In addition, when the pedal-driven vehicle 200 to which the hydraulic pressure control unit 1 according to this embodiment is mounted is seen in the front view, it is possible to reduce the region of the hydraulic pressure control unit 1 that is arranged on the outer side of the front fork 216 to be smaller than the related art. Thus, it is also possible to improve aesthetic appearance of the pedal-driven vehicle 200.

Preferably, in the internal channel 13, a portion that connects the inlet valve recess 18 and the outlet valve recess 19 serves as a channel that extends linearly. With such a configuration, it is possible to suppress pressure loss of the brake fluid flowing through the portion that connects the inlet valve recess 18 and the outlet valve recess 19 in the internal channel 13. Therefore, it is possible to improve performance of the brake system. 100 that includes the hydraulic pressure control unit 1. In addition, with such a configuration, the portion that connects the inlet valve recess 18 and the outlet valve recess 19 in the internal channel 13 has a simple processed shape. Therefore, it is also possible to lower a price of the hydraulic pressure control unit 1. At this time, preferably, in the internal channel 13, a portion that connects the inlet valve recess 18, the outlet valve recess 19, and the wheel cylinder port 12 also serves as a channel that extends linearly. With such a configuration, it is possible to further improve the performance of the brake system 100 that includes the hydraulic pressure control unit 1, and it is possible to further lower the price of the hydraulic pressure control unit 1.

Preferably, the hydraulic pressure control unit 1 includes the pressure sensor 103 that is provided to the pressure sensor recess 22 formed in the base body 10 and detects the pressure of the brake fluid in the wheel cylinder 251. The inlet valve recess 18, the outlet valve recess 19, and the pressure sensor recess 22 are aligned in the axial direction Z. With such a configuration, even in the case where the hydraulic pressure control unit 1 includes the pressure sensor 103, it is possible to easily reduce the dimension in the width direction Y of the base body 10. Thus, even in the case where the hydraulic pressure control unit 1 includes the pressure sensor 103, when the pedal-driven vehicle 200 to which the hydraulic pressure control unit 1 is mounted is seen in the front view, it is possible to reduce the region of the hydraulic pressure control unit 1 that is arranged on the outer side of the front fork 216 to be smaller than the related art, and it is thus possible to suppress the hydraulic pressure control unit 1 from being applied with the external force in comparison with the related art.

Preferably, the inlet valve notch 23 that is recessed outward is formed in the inner circumferential surface of the inlet valve recess 18. In the internal channel 13, the portion that connects the inlet valve recess 18 and the outlet valve recess 19 is connected to the inlet valve notch 23. As illustrated in FIG. 7, in this embodiment, the second channel 15 of the internal channel 13 is connected to the inlet valve notch 23. For example, depending on the arrangement position of the pressure sensor recess 22 or the accumulator 33, or the like, there is a case where the second channel 15 cannot directly be connected to the inlet valve recess 18. In such a case, in order to connect the second channel 15 to the inlet valve recess 18, for example, it is necessary to form a hole that serves as a channel connecting the second channel 15 and the inlet valve recess 18 from the side surface of the base body 10. In this case, in addition to a process of forming the hole that serves as the channel connecting the second channel 15 and the inlet valve recess 18, a closing process of closing an opening of the hole that is formed in the side surface of the base body 10 is necessary. In addition, for example, in the case where the second channel 15 cannot directly be connected to the inlet valve recess 18, it is necessary to connect the second channel 15 and the outlet valve recess 19 and form a hole that serves as a channel connecting the inlet valve recess 18 and the outlet valve recess 19 from the upper surface 25 of the base body 10. Also, in this case, in addition to a process of forming the hole that serves as the channel connecting the inlet valve recess 18 and the outlet valve recess 19, a closing process of closing an opening of the hole that is formed in the upper surface 25 of the base body 10 is necessary. In the case where the hole that serves as the channel connecting the inlet valve recess 18 and the outlet valve recess 19 is formed from the upper surface 25 of the base body 10, a space is formed above the inlet valve recess 18. As a result, when the hydraulic pressure control unit 1 is assembled to the brake system 100 and the channel for the brake fluid in the brake system 100 is filled with the brake fluid, air remains in the space above the inlet valve recess 18, and the air enters the channel for the brake fluid in the brake system 100. Meanwhile, by adopting the configuration to connect the second channel 15 to the inlet valve recess 23, even in the case where the second channel 15 cannot directly be connected to the inlet valve recess 18, it is possible to eliminate the above-described closing process and to connect the second channel 15 to the inlet valve recess 18. That is, by adopting the configuration to connect the second channel 15 to the inlet valve recess 23, even in the case where the second channel 15 cannot directly be connected to the inlet valve recess 18, it is possible to suppress an increase in the number of working processes for the base body 10 and to connect the second channel 15 to the inlet valve recess 18.

Preferably, the upper end portion 23a of the inlet valve notch 23 is located lower than the upper end portion 18c of the inner circumferential surface of the inlet valve recess 18. With such a configuration, when the hydraulic pressure control unit 1 is assembled to the brake system 100 and the channel for the brake fluid in the brake system 100 is filled with the brake fluid, it is possible to suppress air from remaining in the inlet valve notch 23, and it is thus possible to suppress the air from entering the channel for the brake fluid in the brake system 100.

Preferably, the outlet valve notch 24 that is recessed outward is formed in the inner circumferential surface of the outlet valve recess 19. In the internal channel 13, the portion that connects the inlet valve recess 18 and the outlet valve recess 19 is connected to the outlet valve notch 24. As illustrated in FIG. 7, in this embodiment, the second channel 15 of the internal channel 13 is connected to the outlet valve notch 24. For example, depending on the arrangement position of the pressure sensor recess 22 or the accumulator 33, or the like, there is a case where the second channel 15 cannot directly be connected to the outlet valve recess 19. In such a case, in order to connect the second channel 15 to the outlet valve recess 19, for example, it is necessary to form a hole that serves as a channel connecting the second channel 15 and the outlet valve recess 19 from the side surface of the base body 10. In this case, in addition to a process of forming the hole that serves as the channel connecting the second channel 15 and the outlet valve recess 19, a closing process of closing an opening of the hole that is formed in the side surface of the base body 10 is necessary. Meanwhile, by adopting the configuration to connect the second channel 15 to the outlet valve notch 24, even in the case where the second channel 15 cannot directly be connected to the outlet valve recess 19, it is possible to eliminate the above-described closing process and to connect the second channel 15 to the outlet valve recess 19. That is, by adopting the configuration to connect the second channel 15 to the outlet valve notch 24, even in the case where the second channel 15 cannot directly be connected to the outlet valve recess 19, it is possible to suppress the increase in the number of working processes for the base body 10 and to connect the second channel 15 to the outlet valve recess 19.

Preferably, the upper end portion 24a of the outlet valve notch 24 is located lower than the upper end portion 19c of the inner circumferential surface of the outlet valve recess 19. With such a configuration, when the hydraulic pressure control unit 1 is assembled to the brake system 100 and the channel for the brake fluid in the brake system 100 is filled with the brake fluid, it is possible to suppress the air from remaining in the outlet valve notch 24, and it is thus possible to suppress the air from entering the channel for the brake fluid in the brake system 100.

Preferably, only one pair of the inlet valve 31 and the outlet valve 32 is provided. The hydraulic pressure control unit, to which only one pair of the inlet valve and the outlet valve is provided, for the brake system of the single system is desired to be downsized and mounted to an obscure position in the straddle-type vehicle. Thus, the hydraulic pressure control unit 1 according to this embodiment is suitably used as the hydraulic unit for the brake system of the single system.

The pedal-driven vehicle 200 according to this embodiment includes: the hydraulic pressure control unit 1 according to this embodiment; the paired front forks 216; and the front wheel 217 that is held in the freely rotatable manner between the paired front forks 216. At least the part of the base body 10 is arranged between the front fork 216 and the front wheel 217. With the configuration of the pedal-driven vehicle 200 just as described, when the pedal-driven vehicle 200 is seen in the front view, it is possible to reduce the portion of the hydraulic pressure control unit 1 that is arranged on the outer side of the front fork 216 to be smaller than the related art, and it is thus possible to suppress the hydraulic pressure control unit 1 from being applied with the external force in comparison with the related art. In addition, with the configuration of the pedal-driven vehicle 200 just as described, when the pedal-driven vehicle 200 to which the hydraulic pressure control unit 1 is mounted is seen in the front view, it is possible to reduce the portion of the hydraulic pressure control unit 1 that is arranged on the outer side of the front fork 216 to be smaller than the related art, and thus it is also possible to improve the aesthetic appearance of the pedal-driven vehicle 200.

The description has been made so far on the embodiment. However, the present invention is not limited to the description of the embodiment. For example, the embodiment may only partially be implemented. In addition, for example, the portion by which the hydraulic pressure control unit according to the present invention is held is not limited to the front fork. Needless to say, the hydraulic pressure control unit according to the present invention may be held by a frame other than the front fork of the straddle-type vehicle, or the like. As described above, at least the part of the hydraulic pressure control unit according to the present invention can be arranged to a space that is conventionally unused. Therefore, even in the case where the hydraulic pressure control unit according to the present invention is held by the frame other than the front fork of the straddle-type vehicle, or the like, it is possible to suppress the hydraulic pressure control unit according to the present invention from being applied with the external force in comparison with the related art, and the aesthetic appearance of the straddle-type vehicle can be improved.

REFERENCE SIGNS LIST

1: Hydraulic pressure control unit
10: Base body
11: Master cylinder port
12: Wheel cylinder port
13: Internal channel
14: First channel
15: Second channel
16: Third channel
17: Fourth channel
18: Inlet valve recess
18a: First recess
18b: Second recess
18c: Upper end portion
19: Outlet valve recess
19a: First recess
19b: Second recess
19c: Upper end portion
22: Pressure sensor recess
23: Inlet valve notch
23a: Upper end portion
24: Outlet valve notch
24a: Upper end portion
25: Upper surface
26: Lower surface
27: Front surface
27a: Female screw
28: Rear surface
31: Inlet valve
32: Outlet valve
33: Accumulator
35: Control section
36: Circuit board
40: Housing
41: Upper surface
42: Lower surface
43: Front surface
44: Rear surface
45: First side surface
46: Second side surface
47: Inclined section
48: Connector
51: Main body
52: Opening
53: side
54: side
55: side
58: lid
61: First coil
61a: Axis
61b: Top surface
62: Second coil
62a: Axis
62b: Top surface
63: Terminal
64: Terminal
70: Bracket
71: Bolt
75: Jig
100: Brake system
101: Fluid pipe
102: Fluid pipe
103: Pressure sensor
200: Pedal-driven vehicle
210: Frame
211: Head tube
212: Top tube
213: Down tube
214: Seat tube
215: Stay
216: Front fork
216a: Axis
217: Front wheel
218: Saddle
219: Pedal
220: Rear wheel
230: Turning section
231: Steering column
232: Handlebar stem 233: Handlebar
240: Brake operation section
241: Brake lever
242: Master cylinder
243: Reservoir
250: Front-wheel braking section
251: Wheel cylinder
252: Rotor
260: Rear-wheel braking section
270: Power supply unit

What is claimed is:

1. A hydraulic pressure control unit (1) for a brake system (100) mounted to a vehicle (200) and capable of executing anti-lock brake control, the hydraulic pressure control unit (1) being configured to store a brake fluid that is released from a wheel cylinder (251) during depressurization in the anti-lock brake control in an accumulator (33) and to discharge the brake fluid in the accumulator (33) to outside of the accumulator (33) in a pumpless manner, the hydraulic pressure control unit (1) comprising:
 a base body (10) formed with: a master cylinder port (11) to which a fluid pipe (101) communicating with a master cylinder (242) is connected; a wheel cylinder port (12) to which a fluid pipe (102) communicating with the wheel cylinder (251) is connected; and an internal channel (13) that communicates the master cylinder port (11) and the wheel cylinder port (12) with each other;
 an inlet valve (31) that is provided to an inlet valve recess (18) formed in the base body (10) and opens/closes the internal channel (13) during the anti-lock brake control; and
 an outlet valve (32) that is provided to an outlet valve recess (19) formed in the base body (10) and opens/closes the internal channel (13) during the anti-lock brake control, wherein
 the master cylinder port (11) is formed in a first surface (25) of the base body (10),
 the wheel cylinder port (12) is formed in a second surface (26) of the base body (10), the second surface (26) opposing the first surface (25),
 the internal channel (13) is configured not to be able to return the brake fluid in the accumulator (33) to the master cylinder port (11) without interposing the outlet valve (32), and
 the inlet valve recess (18) and the outlet valve recess (19) are aligned in a direction (Z) in which the first surface (25) and the second surface (26) are aligned.

2. The hydraulic pressure control unit (1) according to claim 1, wherein in the internal channel (13), a portion that connects the inlet valve recess (18) and the outlet valve recess (19) serves as a channel that extends linearly.

3. The hydraulic pressure control unit (1) according to claim 2, wherein in the internal channel (13), a portion that connects the inlet valve recess (18), the outlet valve recess (19), and the wheel cylinder port (12) serves as a channel that extends linearly.

4. The hydraulic pressure control unit (1) according to claim 1 and further comprising:
 a pressure sensor (103) that is provided to a pressure sensor recess (22) formed in the base body (10) and detects a pressure of the brake fluid in the wheel cylinder (251), wherein
 the inlet valve recess (18), the outlet valve recess (19), and the pressure sensor recess (22) are aligned in the direction (Z) in which the first surface (25) and the second surface (26) are aligned.

5. The hydraulic pressure control unit (1) according to claim 4, wherein the pressure sensor (103) communicates with a portion of the internal channel (13), the portion connecting the outlet valve recess (19) and the wheel cylinder port (12).

6. The hydraulic pressure control unit (1) according to claim 1, wherein an inlet valve notch (23) that is recessed outward is formed in an inner circumferential surface of the inlet valve recess (18), and
 a portion, which connects the inlet valve recess (18) and the outlet valve recess (19), in the internal channel (13) is connected to the inlet valve notch (23).

7. The hydraulic pressure control unit (1) according to claim 6, wherein in the case where the first surface (25) is set as an upper surface and the second surface (26) is set as a lower surface, an upper end portion (23*a*) of the inlet valve notch (23) is located lower than an upper end portion (18*c*) of the inner circumferential surface of the inlet valve recess (18).

8. The hydraulic pressure control unit (1) according to claim 1, wherein
 an outlet valve notch (24) that is recessed outward is formed in an inner circumferential surface of the outlet valve recess (19), and
 a portion, which connects the inlet valve recess (18) and the outlet valve recess (19), in the internal channel (13) is connected to the outlet valve notch (24).

9. The hydraulic pressure control unit (1) according to claim 8, wherein in the case where the first surface (25) is set as an upper surface and the second surface (26) is set as a lower surface, an upper end portion (24*a*) of the outlet valve notch (24) is located lower than an upper end portion (19*c*) of the inner circumferential surface of the outlet valve recess (19).

10. The hydraulic pressure control unit (1) according claim 1, wherein only one pair of the inlet valve (31) and the outlet valve (32) is provided.

11. A brake system (100) comprising:
 the hydraulic pressure control unit (1) according to claim 1.

12. A vehicle (200) comprising:
 the brake system (100) according to claim 11.

13. The vehicle (200) according to claim 12, wherein in a state where the vehicle (200) is seen in a front view, the hydraulic pressure control unit (1) is arranged in a state where the first surface (25) is set as an upper surface and the second surface (26) is set as a lower surface.

14. The vehicle (200) according to claim 13 further comprising:
 a pair of front forks (216);
 and a front wheel (217) that is held in a freely rotatable manner between wherein at least a part of the base body (10) is arranged between the front fork (216) and the front wheel (217).

15. The hydraulic pressure control unit (1) according to claim 3 and further comprising:
 a pressure sensor (103) that is provided to a pressure sensor recess (22) formed in the base body (10) and detects a pressure of the brake fluid in the wheel cylinder (251), wherein
 the inlet valve recess (18), the outlet valve recess (19), and the pressure sensor recess (22) are aligned in the direction (Z) in which the first surface (25) and the second surface (26) are aligned.

16. The hydraulic pressure control unit (1) according to claim 15, wherein the pressure sensor (103) communicates with a portion of the internal channel (13), the portion connecting the outlet valve recess (19) and the wheel cylinder port (12).

17. The hydraulic pressure control unit (1) according to any claim 16, wherein an inlet valve notch (23) that is recessed outward is formed in an inner circumferential surface of the inlet valve recess (18), and
a portion, which connects the inlet valve recess (18) and the outlet valve recess (19), in the internal channel (13) is connected to the inlet valve notch (23).

18. The hydraulic pressure control unit (1) according to claim 17, wherein in the case where the first surface (25) is set as an upper surface and the second surface (26) is set as a lower surface, an upper end portion (23a) of the inlet valve notch (23) is located lower than an upper end portion (18c) of the inner circumferential surface of the inlet valve recess (18).

19. The hydraulic pressure control unit (1) according to claim 18, wherein
an outlet valve notch (24) that is recessed outward is formed in an inner circumferential surface of the outlet valve recess (19), and
a portion, which connects the inlet valve recess (18) and the outlet valve recess (19), in the internal channel (13) is connected to the outlet valve notch (24).

20. The hydraulic pressure control unit (1) according to claim 19, wherein in the case where the first surface (25) is set as an upper surface and the second surface (26) is set as a lower surface, an upper end portion (24a) of the outlet valve notch (24) is located lower than an upper end portion (19c) of the inner circumferential surface of the outlet valve recess (19), and wherein only one pair of the inlet valve (31) and the outlet valve (32) is provided.

* * * * *